June 6, 1933. H. R. GROSS 1,913,075
SPOTLIGHT MOUNTING AND METHOD
Filed Feb. 23, 1932
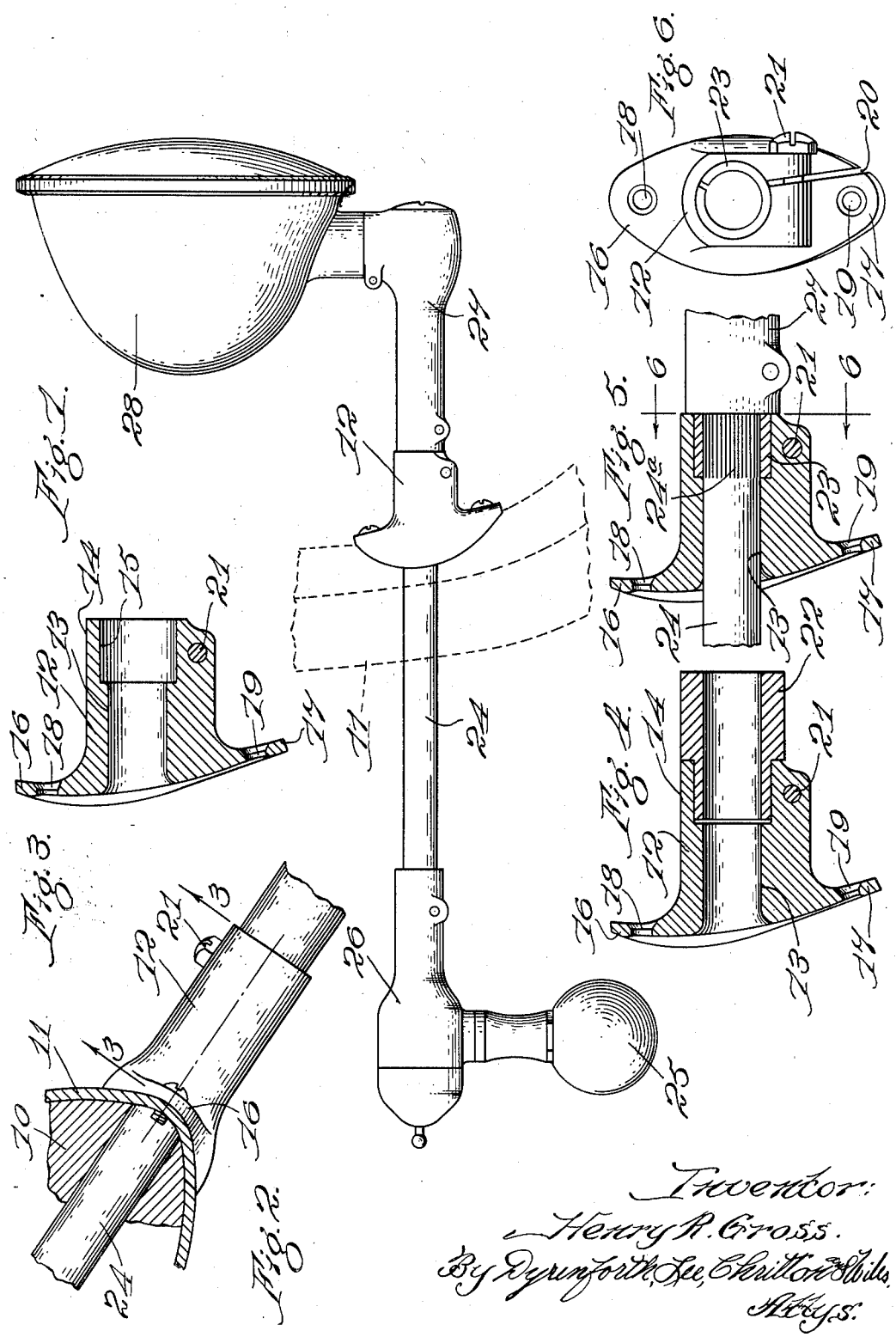

Patented June 6, 1933

1,913,075

UNITED STATES PATENT OFFICE

HENRY R. GROSS, OF CHICAGO, ILLINOIS

SPOTLIGHT MOUNTING AND METHOD

Application filed February 23, 1932. Serial No. 594,654.

This invention relates to improvements in the method of mounting spotlights and spotlight mountings; and is especially applicable to dirigible or adjustable spotlights adapted for use on vehicles, for example, motor vehicles. My invention may be employed, for example, in mounting a spotlight similar in construction and operation to the spotlight shown in my United States Patent, No. 1,702,772, issued February 19, 1929.

Among the features of my invention is the provision of a hollow split clamp having means for attaching the same to a support, for example, the corner post of a motor vehicle. The clamp is provided with an extension having an enlarged bore. This extension is adapted to receive and embrace a hardened steel bushing. In mounting the spotlight, the clamp is first attached to a suitable support, the hardened steel bushing is then inserted in the enlarged bore and used as a guide for a drill in drilling a hole through the support. The hardened steel bushing is then removed and in its place is inserted a shorter split collar having an inner diameter substantially the same as the normal inner diameter of the clamp. There is thus formed a long support of uniform diameter for the tubular guide in which the light is mounted.

By the use of my invention, the mounting of a spotlight of the character referred to is greatly facilitated and the accuracy of its position is insured.

Other features and advantages of my invention will appear more fully as I proceed with my specification.

In that form of device embodying the features of my invention shown in the accompanying drawing—

Figure 1 is a view in front elevation of a spotlight mounted in accordance with my invention; Fig. 2 is a fragmentary horizontal sectional view taken through the corner post of a vehicle; Fig. 3 is a view taken as indicated by the line 3 of Fig. 2; Fig. 4 is a view similar to Fig. 3 showing the hardened steel bushing in place in the clamp; Fig. 5 is a view similar to Fig. 4 showing the spotlight in place; and Fig. 6 is a view taken as indicated by the line 6 of Fig. 5 with the tubular guide removed from the clamp.

As shown in the drawing, 10 may indicate the corner post of a motor vehicle and 11, a portion of the sheet metal body or lining. 12 indicates a hollow split clamp, the normal bore of the same being indicated by 13. This clamp is provided with an extension 14 having an enlarged bore 15. Means are provided for attaching the clamp to a support. As here shown, such means include the ears 16 and 17 with the screw holes 18 and 19. The split in the clamp is indicated by 20 and the adjacent faces are adapted to be drawn together by the screw 21 in order to contract the clamp.

In mounting the spotlight, the clamp 12 is first attached in proper position to a suitable support, for example, a corner post 10, as shown in Fig. 2. There is then inserted in the enlarged bore 15 in the extension 14 a hardened steel bushing 22 (the outer diameter of one end of the bushing being reduced for this purpose) with an inner diameter substantially the same as the normal inner diameter 13 of the hollow clamp. A drill is then inserted through the steel bushing 22, the latter acting as a drill guide. The drill, thus guided, is used to make a hole through the corner post 10 and metal 11. The hardened steel bushing acting as a guide holds the drill in proper position and prevents the same from unduly scratching, enlarging or mutilating the clamp 12 which ordinarily is made of softer metal than the hardened steel bushing 22. The drill and bushing 22 are then removed and a split collar 23 is placed in the enlarged bore 15 in the extension 14 of the clamp. This split collar is preferably short enough so that it does not project substantially beyond the end of the extension 14 when in place. The inner diameter of the split collar 23 is substantially the same as the normal inner diameter 13 of the clamp 12 or slightly smaller.

A hollow guide 24 is then placed in the clamp, said guide preferably being milled, roughened, or knurled, as indicated by 24ª, where the same lies inside of the split collar 23. The screw 21 is then tightened to contract the clamp and split collar 23 to firmly grip and hold the hollow guide 24. The knurling 24ª may increase the grip of the collar 23, especially if the diameter of such collar is made slightly smaller than the normal diameter 13 of the clamp.

The spotlight is mounted in the hollow guide 24 in the same general manner as shown in my earlier patent above referred to; and, consequently, further details are not necessary. In general, it may be stated that the guide 24, here shown, corresponds to the tubular guide 13 of such earlier patent. It is to be understood also that the general details of construction and operation of the spotlight as here shown may be similar to those of the spotlight of my earlier patent. Such spotlight may include a handle 25, corresponding to the handle 11, a handle support 26, corresponding to the handle support 20, a lamp support 27, corresponding to the lamp support 21, and a light 28, corresponding to the light 12.

The spotlight may also be mounted without using a hardened steel bushing 22. When this is done, the clamp 12 itself is used as a guide. A drill having substantially the diameter of the normal diameter 13 of the clamp is used and the bore 13 is used as a guide for the drill. When thus used, the drill may enlarge or multilate the bore 13 to some extent. Since the enlarged bore 15 in the extension 14 is larger than the drill, it will not be cut by the drill. Consequently, when the split collar 23 is inserted in the extension, there will be insured a firm clamping of the guide 24. When the spotlight is thus mounted without using a hardened steel bushing as a guide for the drill, the entire clamp 12 may be considered as a combination clamp and drill guide. That is, the normal bore 13 is the drill guide and the same may become enlarged or mutilated by the drill, thus impairing its usefulness as a clamp on the guide 24. The bore 15 of the extension 14, however, is not touched by the drill and, consequently, its clamping efficiency is not impaired.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A spotlight mounting, including; a hollow clamp with a normal bore adapted to be used as a drill guide and having an extension having an enlarged bore; means for attaching the clamp to a support with the normal bore adjacent the support; a tubular guide extending through the clamp; and a split collar around the guide and in the enlarged bore of the clamp.

2. A spotlight mounting as claimed in claim 1, in which the clamp is split and provided with means for contracting the same.

3. A spotlight mounting as claimed in claim 1, in which the portion of the guide inside of the split collar is roughened.

In witness whereof, I have hereunto set my hand, this 18th day of February, 1932.

HENRY R. GROSS.